Patented Sept. 26, 1939

2,174,182

UNITED STATES PATENT OFFICE 2,174,182

VAT-DYESTUFFS OF THE PHTHALOYL-CARBAZOLE SERIES CONTAINING TRIFLUOROMETHYL GROUPS

Hans Schlichenmaier, Frankfort-on-the-Main, Hans Hoyer, Leverkusen, and Ludwig Wilhelm Berlin, Frankfort-on-the-Main, Germany, assignors to General Aniline Works, Inc., New York, N. Y., a corporation of Delaware No Drawing. Application April 7, 1938, Serial No. 200,676. In Germany April 13, 1937

5 Claims. (Cl. 260—316)

The present invention relates to vat-dyestuffs of the phthaloyl-carbazole series containing trifluoromethyl groups.

We have found that vat-dyestuffs of the phthaloyl-carbazole series containing trifluoromethyl groups are obtained by transforming into carbazoles according to known processes compounds of the following formulae:

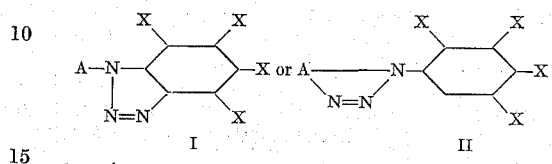

wherein A is the radical of an anthraquinone compound, at least one X stands for a trifluoromethyl radical and the other X's are hydrogen or any substituents, two adjacent ones of which may also be members of a further ring system; or similar anthraquinone compounds containing the azimide radical twice.

Compounds corresponding to Formula I may be obtained by causing, for instance, an anthraquinone compound containing halogen in alpha-position and in the other positions, especially in the other alpha-positions, substituents as, for instance, methoxy or acylamino groups or also halogen, to react, in the presence of an acid binding agent and copper, with a trifluoromethyl-substituted azimino-compound, hydrogen halide being evolved. If several alpha-halogen atoms are present in the starting material, the reaction with the azimino-compounds may occur several times.

A further method for obtaining compounds of Formula I consists in condensing, for instance, an alpha-amino-anthraquinone, which may contain in the other positions substituents, in the presence of an acid-binding agent and copper as a catalyst, with an ortho-nitro-halogen-benzene containing one or more trifluoromethyl groups, hydrogen halide being evolved, reducing according to known methods the ortho-nitro-aryl-amino-anthraquinone obtained and treating the product of reduction with a diazotizing agent.

The compounds or Formula II may be obtained by causing, for instance, an ortho-amino-substituted alpha-halogen-anthraquinone, which may be substituted in the other positions, to react, according to known methods, with an aromatic amine containing one or more trifluoromethyl groups and treating the compound thus obtained with a diazotizing agent.

The transformation of the compounds of the Formulae I and II and of similar compounds into the new carbazole dyestuffs is carried out by known processes, for instance, preferably by heating the parent materials in a solvent of high boiling point, such as diphenylamine, treating the mass with alcohol and recrystallizing the residue obtained from a solvent of high boiling point as, for instance, nitrobenzene or trichlorobenzene. The new dyestuffs containing trifluoromethyl, as compared with the dyestuffs which do not contain any trifluoromethyl groups, are distinguished in part by finer shades and in part by better properties of fastness and constitute, therefore, an advance in the art.

The new dyestuffs may be transformed into their acid leucosulfuric acid esters, which, developed on the fiber, yield clear shades. The transformation is performed according to known methods, for instance, by reduction and the action of sulfuric anhydride or an agent yielding sulfuric anhydride in the presence of a tertiary base.

The following examples serve to illustrate the invention, but they are not intended to limit it thereto; the parts are by weight:—

1. 500 parts of nitrobenzene together with 50 parts of alpha-chloranthraquinone, 60 parts of 1-trifluoromethyl-3.4-aziminobenzene (obtainable by diazotizing 1-trifluoromethyl-3.4-diaminobenzene), 40 parts of potassium acetate and 2 parts of copper acetate, are heated to boiling for 3 hours. The intermediate product obtained is allowed to cool, filtered with suction and boiled with alcohol and subsequently with water. The residue is introduced into 5 times its weight of molten diphenylamine and the mixture is heated at 280° C. to 290° C., until no more nitrogen is evolved. The mixture is cooled and boiled with alcohol until the diphenylamine has entirely dissolved. The residue obtained consists of leaflets having a yellow lustre and melting at 327° C. to 330° C. When the product is recrystallized from trichlorobenzene, its melting point is scarcely raised, being then 330° C. to 332° C. The product dissolves in concentrated sulfuric acid to a blue solution. The new dyestuff dyes, in a red clear vat, after exposing to air, a clear greenish yellow of good fastness to washing, to chlorine, to sodium carbonate, to boiling and to light. The dyestuff has probably the following constitution:

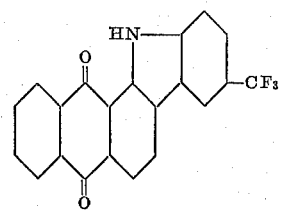

2. A mixture of 750 parts of nitrobenzene, 72 parts of alpha-amino-anthraquinone, 130 parts of 1-trifluoromethyl-3-nitro-4-chlorobenzene, 6 parts of copper and 30 parts of anhydrous potassium carbonate, is heated to boiling for about 4 hours. The crystalline magma, after cooling, is filtered with suction and washed with chlorobenzene. The melting point of the product, which crystallizes in the form of brown needles is 243° C.; it dissolves in concentrated sulfuric acid to a green solution.

14.4 parts of the above product contained in 200 parts of chlorobenzene and in the presence of 0.3 part of active nickel, are treated with hydrogen at 20–30 atm. pressure and 60° C. to 70° C. in a horizontal autoclave provided with a stirrer, until that amount of hydrogen has been absorbed which is necessary for reducing the nitro-group. The content of the vessel, after cooling, is filtered with suction and the crude amine obtained is recrystallized from chlorobenzene to free it from the catalyst. It consists of violet, well-defined needles melting at 248° C. The product dissolves in concentrated sulfuric acid to a violet solution.

38.2 parts of this amine are suspended in 500 parts of concentrated hydrochloric acid and, after addition of a solution of 18 parts of NaNO₂ in 100 parts of water, the mixture is rolled in a ball mill, until a test portion examined under the microscope no longer shows the brown crystals of the parent material, but only the feebly yellow crystals of the diazotized compound. As soon as this is the case, the crystals are filtered with suction and dried under reduced pressure. The diazotized compound is identical with the intermediate product obtained according to the process of Example 1. When these crystals are melted with diphenylamine, as described in Example 1, there are similarly obtained leaflets having a yellow lustre and melting at 330° C.; with respect to their chemical and dyeing properties they are identical with the dyestuff obtained by the process of Example 1.

3. Nitrobenzene containing 25.3 parts of 1-amino-4-methoxy-anthraquinone, 45 parts of 1-trifluoromethyl-3-nitro-4-chlorobenzene, 2 parts of copper and 20 parts of potassium carbonate is heated to boiling for about 2 hours; the product is filtered with suction; the residue obtained melts when recrystallized from trichlorobenzene at a temperature of 261° C.; it dissolves in concentrated sulfuric acid to an intensely green solution. When this compound is reduced in the above-described way, an amine is obtained which melts at 250° C. and forms violet needles dissolving in concentrated sulfuric acid to a blue solution. When treated with a diazotizing agent and melted, as described in Example 2, this amine yields a dyestuff crystallizing in the form of orange needles and melting at 262° C. It dissolves in concentrated sulfuric acid to a blue solution and dyes cotton, in a yellow-red vat, after exposure to air, red-orange tints.

4. Nitrobenzene containing 34.2 parts of 1-amino-4-benzoylamino-anthraquinone, 50 parts of 1-trifluoromethyl-3-nitro-4-chlorobenzene, 3 parts of copper and 20 parts of potassium carbonate, is heated to boiling for about 6 hours. The crude product which separates after cooling is recrystallized from trichlorobenzene and then forms red-brown leaflets melting at 248° C. When this compound is reduced, according to known methods, an amine melting at 255° C. is obtained; by diazotizing and melting this amine, as described in Examples 1 and 2, red needles melting at 284° C. are obtained; they dye cotton, from a red vat, after exposure to air, red tints of good fastness to light. The dyestuff has probably the following constitution:

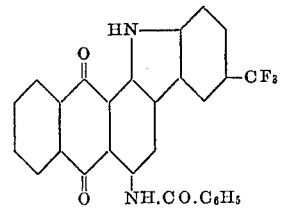

5. A mixture of 5.6 parts of 1.5-dichloranthraquinone, 7.6 parts of 1-trifluoromethyl-3.4-aziminobenzene, 4 parts of potassium carbonate, 0.2 part of copper acetate and 50 parts by volume of nitrobenzene is heated to boiling, for 3 hours. The mixture, after cooling, is filtered with suction and the residue obtained is first boiled with alcohol and then with water. The brown product obtained dissolves in concentrated sulfuric acid to a blue-violet solution. It is heated with about 5 times its weight of diphenylamine whereby a double carbazole ring-closure occurs, nitrogen being evolved. The carbazole formed is red-brown, melts at 395° C. to 397° C. and dissolves in concentrated sulfuric acid to a pure blue solution; it dyes cotton, in a light-red vat, orange tints. The dyestuff has probably the following constitution:

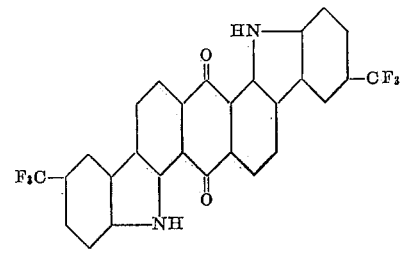

6. By the process of Example 1, the 1.4-dichloranthraquinone is converted into the dicarbazole. The wine-red carbazole obtained melts at 360° C. to 365° C., dissolves in concentrated sulfuric acid to a violet solution and dyes cotton or rayon, in a dark-red vat, an intense red-violet tint. The dyestuff has probably the following constitution:

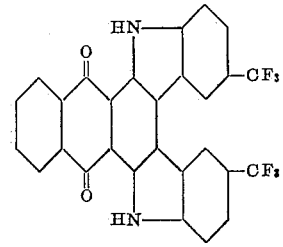

7. A mixture of 361.5 parts of 1-chloro-5-benzoyl-amino-anthraquinone, 247 parts of 4-amino-3-nitro-1-trifluoromethylbenzene, 108 parts of potassium acetate, 3 parts of copper acetate and 1000 parts of naphthalene is heated at 180° C. to 190° C., until the condensation is complete. The melt is, while hot, diluted with benzene and filtered with suction; the solid matter is washed with methanol and dilute hydrochloric acid and when dry is recrystallized from nitrobenzene. Brown prisms are obtained which dissolve in concentrated sulfuric acid to a red-brown solution which, on addition of trioxymethylene, turns violet-blue. The dyestuff has probably the following constitution:

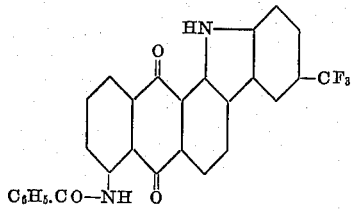

100 parts of the 2'-nitro-4'-trifluoromethyl-1-phenylamino-5-benzoylamino-anthraquinone thus obtained are made into a paste with 500 parts of methanol. 2100 parts of water and 750 parts of caustic soda solution of 30 per cent. strength are then added and 300 parts of sodium hydrosulfite are, at 50° C., strewed in. When the reduction is complete, air is blown into the vat, it is filtered with suction, the residue is washed until neutral, dried and recrystallized from ortho-dichloro-benzene. Blue-black needles are obtained which dissolve in sulfuric acid to a blue-red-olive solution which, on addition of trioxy-methylene, turns violet. 501 parts of the 2'-amino-4'-trifluoromethyl-1-phenylamino-5-benzoyl-amino-anthraquinone thus obtained are suspended in 5000 parts of glacial acetic acid and, while stirring 175 parts of amyl nitrite are dropped in on the water-bath. When the diazotization is complete, the yellow crystals of the triazole formed are filtered with suction, washed with methanol and dried. The compound probably corresponds with the following formula:

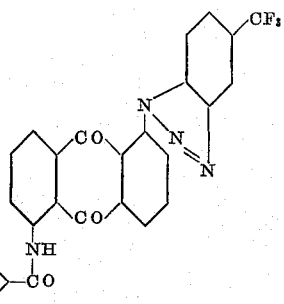

It is sufficiently pure for further working up. 100 parts of this trifluoromethyl-benztriazolyl-5-benzoylamino-anthraquinone are heated at 300° C. in 300 parts of diphenylamine, until nitrogen is no longer evolved. The melt is, while hot, diluted with benzene, filtered with suction and the carbazole, which is obtained already in a rather pure form, is, if desired, recrystallized from nitrobenzene. Orange needles are thus obtained which dissolve in concentrated sulfuric acid to a blue solution. The dyestuff dyes, in a brown vat, a clear golden-yellow tint of very good fastness.

8. A mixture of 361.5 parts of 1-chloro-5-benzoylamino-anthraquinone, 224 parts of 1-trifluoro-methyl-3.4-aziminobenzene (cf. Example 1), 108 parts of potassium acetate, 3 parts of copper acetate and 1000 parts of nitrobenzene is heated, for 12 hours, at 180° C. to 190° C. The product is diluted with alcohol and filtered with suction; the solid matter thus obtained is washed with dilute hydrochloric acid and dried. Yellow crystals are obtained which are sufficiently pure for further working up. 100 parts of the intermediate product thus obtained are heated in 300 parts of diphenylamine at 300° C. until nitrogen is no longer evolved. The melt is, while hot, diluted with benzene, filtered with suction and the crude carbazole is recrystallized from nitrobenzene. Orange needles are thus obtained which, from a brown vat, dye a golden-yellow tint of very good properties of fastness.

9. Into a mixture of pyridine and sulfuric anhydride, prepared by introducing, drop by drop, 35 grams of chloro-sulfonic acid methyl ester into 200 grams of pyridine, an intimate mixture of 20 grams of 1.2-phthaloyl-6-trifluoromethyl-carbazole (obtainable according to the process of Example 1) with 14 grams of copper bronze is introduced, care being taken that atmospheric oxygen is excluded by introducing a stream of carbonic acid into the reaction vessel, and the temperature is maintained at 35° C. to 40° C. until the esterification is complete. The mass is then poured into water. After some time the pyridine salt of the leuco sulfuric acid ester has become solid. It is filtered with suction and then dissolved by treating it with 40 to 50 cc. of caustic soda solution of 30 per cent. strength, about 150 cc. of alcohol and 500 cc. of water of 70° C. The copper is eliminated by filtration with suction, then the pyridine and part of the water are distilled under reduced pressure and the leuco sulfuric acid ester of phthaloyltrifluoromethylcarbazole is salted out by means of potassium chloride. The ester is obtained as potassium salt in the form of yellow leaflets which are easily soluble in water. When treating the ester with sodium nitrite and sulfuric acid the phthaloyltrifluoromethylcarbazole is obtained in the form of brilliant yellow flakes.

The esterified trifluoromethylphthaloylcarbazole is especially suitable for use in printing. It yields according to the usual developing processes very clear, brilliant, greenish yellow tints of very good properties of fastness.

In the same way and with a similar effect also the halogenation products may be esterified.

We claim:

1. The members of the group consisting of compounds of the general formulae:

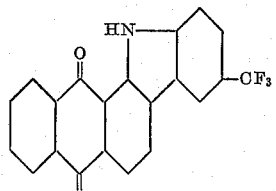

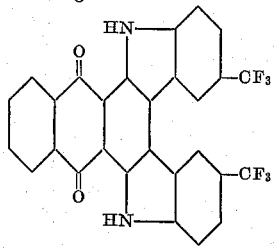

and

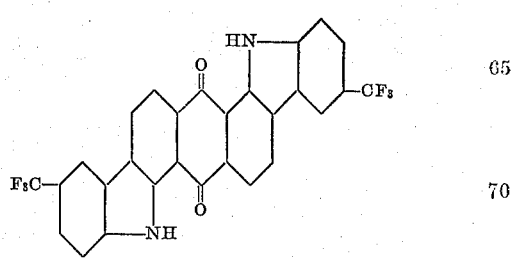

being vat-dyestuffs yielding tints of good fastness properties.

2. The members of the class of compounds characterized by the general formula:

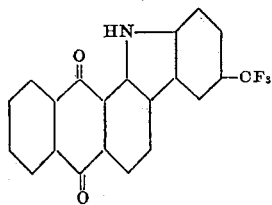

being vat-dyestuffs yielding tints of good fastness properties.

3. The compound of the formula:

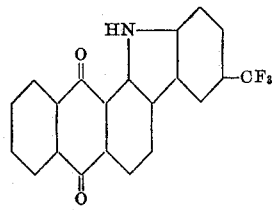

melting at 330° C. to 332° C., dissolving in concentrated sulfuric acid to a blue solution and dyeing, from a red clear vat, clear greenish yellow tints of good fastness to washing, to chlorine, to sodium carbonate, to boiling and to light.

4. The compound of the formula:

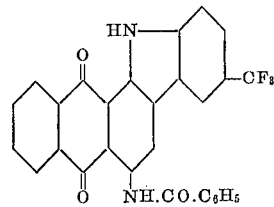

melting at 284° C. and dyeing cotton, from a red vat, red tints of good fastness to light.

5. The compound of the formula:

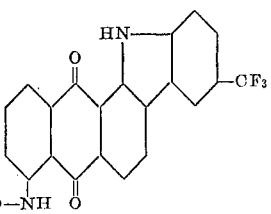

forming orange-colored small needles, dissolving in concentrated sulfuric acid to a blue solution and dyeing, from a brown vat, clear golden yellow tints of very good fastness properties.

HANS SCHLICHENMAIER.
HANS HOYER.
LUDWIG WILHELM BERLIN.